(12) United States Patent
Lu et al.

(10) Patent No.: US 11,892,990 B2
(45) Date of Patent: Feb. 6, 2024

(54) REMOVAL OF TRANSACTION NOISE

(71) Applicant: International Business Machines Corporation, Armonk, NY (US)

(72) Inventors: Shuyan Lu, Cary, NC (US); Yi-Hui Ma, Mechanicsburg, PA (US); Eugene Irving Kelton, Wake Forest, NC (US); John H. Walczyk, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/140,203

(22) Filed: Jan. 4, 2021

(65) Prior Publication Data

US 2022/0215006 A1     Jul. 7, 2022

(51) Int. Cl.
| | |
|---|---|
| *G06F 16/215* | (2019.01) |
| *G06Q 30/018* | (2023.01) |
| *G06F 16/25* | (2019.01) |
| *G06F 17/14* | (2006.01) |
| *G06F 16/178* | (2019.01) |

(52) U.S. Cl.
CPC ........ *G06F 16/215* (2019.01); *G06F 16/1794* (2019.01); *G06F 16/258* (2019.01); *G06F 17/14* (2013.01); *G06Q 30/0185* (2013.01)

(58) Field of Classification Search
CPC ...... G06F 16/215; G06F 16/258; G06F 17/14; G06F 16/1794; G06Q 30/0185
See application file for complete search history.

(56) References Cited

U.S. PATENT DOCUMENTS

| | | |
|---|---|---|
| 10,827,039 B1 | 11/2020 | Dandekar |
| 2006/0116920 A1 | 6/2006 | Shan |
| 2006/0212487 A1* | 9/2006 | Kennis .................. G06Q 10/10 |

(Continued)

FOREIGN PATENT DOCUMENTS

| | | |
|---|---|---|
| CN | 110197374 A | 9/2019 |
| WO | 02046474 A3 | 6/2002 |

OTHER PUBLICATIONS

Tianqing, Zhu, "Suspicious Financial Transaction Detection Based on Empirical Mode Decomposition Method", Proceedings of the 2006 IEEE Asia-Pacific Conference on Services Computing (APSCC'06), © 2006 IEEE, 5 pages.

(Continued)

*Primary Examiner* — Hosain T Alam
*Assistant Examiner* — Lin Lin M Htay
(74) *Attorney, Agent, or Firm* — Stephen R. Yoder (57) ABSTRACT

Embodiments of the present invention provide a computer system a computer program product, and a method that comprises converting received data from a time-based domain to a frequency-based domain using a signal processing algorithm; identifying transactional noise within the converted data by identifying contextual factors based on a determined pattern, wherein the transactional noise is data associated with an identified fraudulent transaction; filtering the identified transactional noise by removing datapoints within the converted data that reaches a predetermined threshold of signal strength using the signal processing algorithm; and generating a line graph depicting removal of the data that is indicative of the identified transactional noise from the converted data.

20 Claims, 4 Drawing Sheets

(56) References Cited

U.S. PATENT DOCUMENTS

| | | | |
|---|---|---|---|
| 2007/0061211 A1* | 3/2007 | Ramer | G06Q 30/02 |
| | | | 705/25 |
| 2009/0018798 A1 | 1/2009 | Dorneich | |
| 2011/0131122 A1 | 6/2011 | Griffin | |
| 2013/0036037 A1 | 2/2013 | Meredith | |
| 2015/0039512 A1* | 2/2015 | Adjaoute | G06Q 20/384 |
| | | | 705/44 |
| 2015/0178825 A1 | 6/2015 | Huerta | |
| 2017/0011382 A1 | 1/2017 | Zoldi | |
| 2018/0351786 A1* | 12/2018 | Pope | H04L 67/34 |
| 2019/0311367 A1 | 10/2019 | Reddy | |
| 2019/0349426 A1* | 11/2019 | Smith | H04L 63/123 |
| 2021/0312450 A1 | 10/2021 | Allbright | |
| 2022/0050728 A1 | 2/2022 | Foster, II | |
| 2022/0215278 A1 | 7/2022 | Lu | |
| 2022/0237516 A1 | 7/2022 | Schmidt | |

OTHER PUBLICATIONS

Lu et al., "Scaling Transactions With Signal Analysis" U.S. Appl. No. 17/064,627, filed Oct. 7, 2020, 23 pages.

Lu et al., "Vector Alignment of Signal Lag", U.S. Appl. No. 17/140,192, filed Jan. 4, 2021, 24 pages.

Appendix P—List of IBM Patents or Patent Applications Treated as Related, Filed herewith, 2 Pages, Filed Jan. 4, 2021.

\* cited by examiner

REMOVAL OF TRANSACTION NOISE

BACKGROUND

The present invention relates generally to the field of data pipeline technology, and more specifically data cleaning technology within data pipeline technology.

A data pipeline is a series of steps that moves data through a process. The output of a preceding step in the process becomes the input of the subsequent step. Data, typically raw data, goes in one side, goes through a series of steps, and then pops out the other end ready for use or already analyzed. The steps of a data pipeline can include cleaning, transforming, merging, modeling, and more, in any combination. Depending on the level of complexity associated with the data, these data pipelines may be simple and may become highly complex.

Data cleaning is the process of detecting and correcting (or removing) corrupt or inaccurate records from a record set, table, or database and refers to identifying incomplete, incorrect, inaccurate or irrelevant parts of the data and then replacing, modifying, or deleting the dirty or coarse data. Data cleansing may be performed interactively with data wrangling tools, or as batch processing through scripting. After cleansing, a data set should be consistent with other similar data sets in the system. The inconsistencies detected or removed may have been originally caused by user entry errors, by corruption in transmission or storage, or by different data dictionary definitions of similar entities in different stores. Data cleaning differs from data validation in that validation almost invariably means data is rejected from the system at entry and is performed at the time of entry, rather than on batches of data.

The actual process of data cleansing may involve removing typographical errors or validating and correcting values against a known list of entities. The validation may be strict (such as rejecting any address that does not have a valid postal code) or fuzzy (such as correcting records that partially match existing, known records.) Some data cleansing solutions will clean data by cross-checking with a validated data set. A common data cleansing practice is data enhancement, where data is made more complete by adding related information. For example, appending addresses with any phone numbers related to that address. Data cleaning may also involve harmonization (or normalization) of data, which is the process of bringing together data of "varying file formats, name conventions, and columns", and transforming it into one cohesive data set; a simple example is the expansion of abbreviations.

SUMMARY

Embodiments of the present invention provide a computer system a computer program product, and a method that comprises converting received data from a time-based domain to a frequency-based domain using a signal processing algorithm; identifying transactional noise within the converted data by identifying contextual factors based on a determined pattern, wherein the transactional noise is data associated with an identified fraudulent transaction; filtering the identified transactional noise by removing datapoints within the converted data that reaches a predetermined threshold of signal strength using the signal processing algorithm; and generating a line graph depicting removal of the data that is indicative of the identified transactional noise from the converted data.

DETAILED DESCRIPTION

Embodiments of the present invention recognize the need for an improvement to data cleaning technology systems due to the amount of time and resources needed to clean data that is defined as complex. In this embodiment, complex data is defined as raw data with multiple data points and each data point requiring a generated data pipeline for data cleaning. Current data cleaning technology systems within a financial crime arena regulate, observe, and analyze data transactions for a predetermined amount of time, which exhausts a larger number of resources to regulate, observe, and analyze data transactions for any longer period of time than the predetermined amount of time customarily affixed to these data transactions. Furthermore, data cleaning technology systems lack an ability to identify patterns and determine noise of data that is attempting to hide intentional fraud actions within an efficient timely manner. Embodiments of the present invention improve the efficiency and lower the cost of current data cleaning technology systems by applying a filtering determined noise within data using a signal processing algorithm and removing transactional noise by transferring the data transactions from a measure time domain to a measure frequency domain. Embodiments of the present invention improve the efficiency in time and resources of data cleaning technology systems by standardizing a transaction time sequence data to form a transaction signal for use in identifying patterns from the financial transaction time series. The conversion of data include one or more of: 1) standardizing the transaction signal by applying transforming the data from a transactional time-based domain to a frequency-based domain; 2) determining the noise between at least two signal representations of received data using measure the similarity signals; and 3) applying a filter to each converted signal representation of each transaction time sequence data to remove a transaction noise from each discrete converted signal representation. Embodiments of the present invention improve the efficiency of current data cleaning technology by applying a filter to each transactional data signal to remove a large amount of additional meaningless information, which is defined as transactional noise. Embodiments of the present invention receive a plurality of transactional data and applies the filter to remove the transactional noise associated with each transactional data signal.

Figure 1:
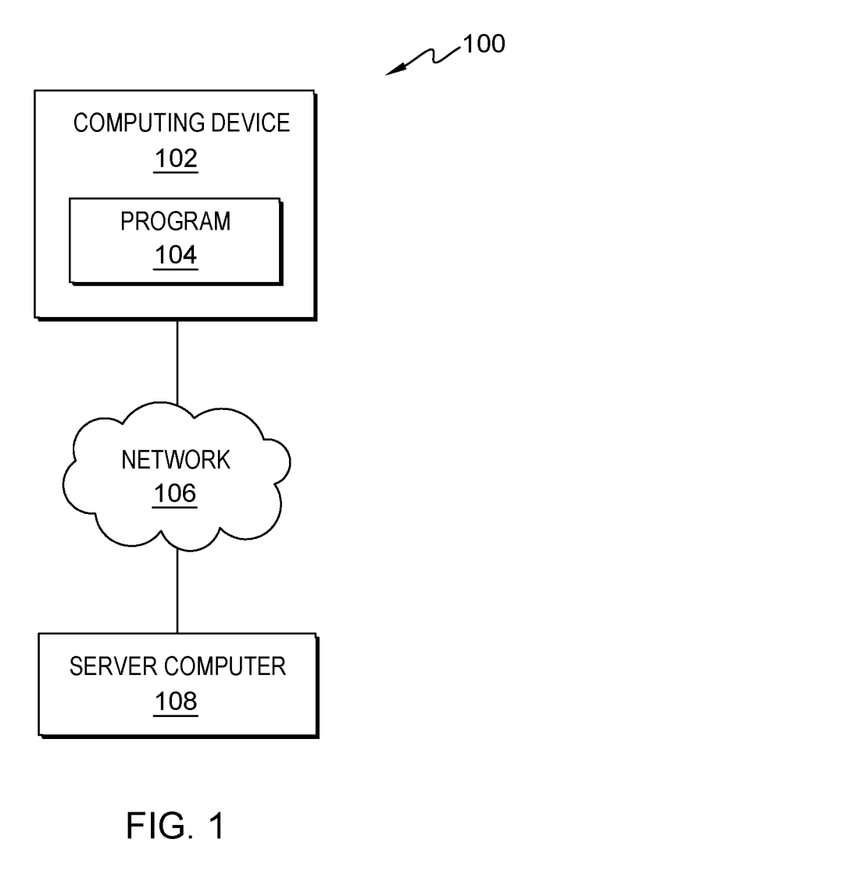
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 removes the transactional noise associated with the transactional data signal based on an analysis of the transactional data. In this embodiment, the program 104 dynamically removes transactional noise by applying a filter to the received transactional data. In this embodiment, the program 104 dynamically removes transactional noise in a frequency domain by applying a Fourier Transform to convert the received transactional data from a time domain to a frequency domain for removal of the transactional noise associated with the frequency domain. In this embodiment, the program 104 removes transactional noise based on a determination of a signal strength associated with the received transactional data in the frequency domain. In this embodiment, the program 104 generates a line graph depicting the received transactional data after the removal of the transactional noise using the application of the filter within a user interface. In this embodiment, the program 104 transmits the generated line graph to a server computing device 108 via a network 106. In another embodiment, the program 104 transmits the generated line graph to a computing device 102 associated with a bank, company, or corporation.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
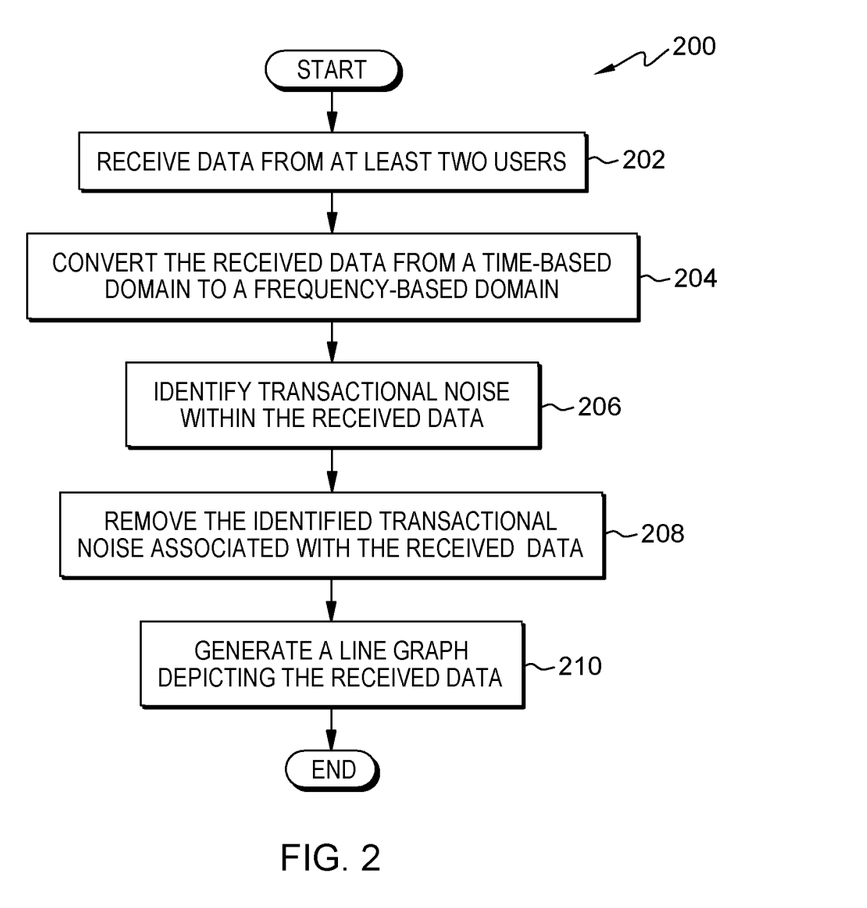
FIG. 2 is a flowchart illustrating operational steps for applying a filter to each converted signal representation for the removal of a transaction noise, in accordance with at least one embodiment of the present invention.

FIG. 2 is a flowchart 200 illustrating operational steps for applying a filter to each converted signal representation for the removal of a transaction noise, in accordance with at least one embodiment of the present invention.

In step 202, the program 104 receives financial transactional data from at least two users. In this embodiment, the program 104 receives transactional data from at least two users in a plurality of users. In this embodiment, the program 104 defines transactional data as data that contains a time dimension with a timeliness to it, which becomes less relevant over time. For example, the program 104 receives a deposit for $5,000 from an account associated with a user that becomes void if not processed within 48 hours. In this embodiment and in a subsequent step, the time domain is converted into a frequency domain. In this embodiment, transactional data may be procedural data, financial data, or other forms of data that contain a timestamp. In this embodiment, the program 104 receives opt-in/opt-out permission from the user prior to receiving data, where the opt-in/opt-out permission allows a user to terminate permission for the program 104 to receive any data associated with the user at any time. For example, the program 104 receives financial transactional data transmitted from the user to a bank associated with the user, and the data contains an amount transmitted and the time of the transmissions.

In step 204, the program 104 transforms the received transactional data from a time-based domain to a frequency-based domain using a signal processing algorithm. In this embodiment, the program 104 transforms the received transactional data from a time-based domain to a frequency-based domain by utilizing the following equation:

$$y_{k+1} = \Sigma_{j=0}^{n-1} w^{jk} x_{j+1} \qquad (1)$$

With respect to equation (1), y is defined as the frequency series, k is defined as the wavenumber, which the number of complete waves that fit in an interval, w is defined as the number of samples, j is defined as the square root of −1, and x is defined as the timer series. In this embodiment, the program 104 utilizes equation (1) to transform or convert the received transactional data from a time function to a frequency function. In this embodiment, the program 104 defines the equation as a mathematical transform that decomposes a function into its constituent frequencies.

In step 206, the program 104 identifies transactional noise within the received transactional data. In this embodiment and in response to converting the received data from the time-based domain to the frequency-based domain, the program 104 identifies transaction noise associated with the received transactional data by identifying contextual factors associated with the received transactional data based on an analysis of the data. In this embodiment, the program 104 defines transactional noise as corrupted or distorted data that impacts a signal to noise ratio associated with the transactional data. For example, the program 104 identifies transactional noise as received data that is not related to hidden intentional fraud transactions. In another embodiment, the program 104 identifies transactional noise as any data that a user system cannot understand or interpret correctly. In this embodiment, the program 104 defines contextual factors as any factor that has an impact (positive or negative) on a determined pattern of the received data. For example, contextual factors include a starting timestamp, an ending timestamp, a calendar date, a transaction amount, details associated with the user, details associated with an account of the user, stock market trends, inflation rates, and global currency exchange rates. In this embodiment, the program 104 identifies contextual factors within the received data by identifying indicative markers associated with the transactional noise. In this embodiment, the program 104 defines indicative markers as details that identify and distinguish transactional noise from a remainder of the transactional data associated with an account of each user. For example, the program 104 identifies the signal to noise ratio, account numbers associated with a known fraudulent transaction, and transaction destination associated with the transactional data as an indicative marker that distinguish the transactional noise from the remainder of the received data. For example, the program 104 identifies transactional amount and time of transaction as contextual factors associated with the received data. For example, the program 104 identifies that a transactional data contains three minutes of communication, but one minute is silence; then the program 104 identifies the one minute of silence as transactional noise.

In this embodiment, the program 104 determines a pattern within the received data based on the identified transactional noise. In this embodiment, the program 104 determines a pattern within the received data by determining a periodicity associated with the received data for each respective user. In this embodiment, the program 104 defines the determined periodicity as the calculated frequency of transactions occurring for a user over a concentrated period of time. In this embodiment, the program 104 determines a pattern by measuring a similarity between a transaction vector (such as transaction amount or time of transaction) and the lagged received data. For example, the program 104 determines that an account associated with user B consistently withdrawals $5,000 three days after user A deposits $5,000 in an account associated with user A.

In this embodiment, the program 104 determines the periodicity by comparing the contextual factors associated with the received transactional data (i.e., correlation coefficients) to the identified transactional noise associated with the received data; converting the received transactional data from a time-based domain to a frequency-based domain by using the signal processing algorithm; and calculating a signal strength associated with the transaction vectors of the received transactional data. In this embodiment, the program 104 determines that the calculated signal strength is a function of the frequency-based domain associated with the received transactional data based on the comparison of contextual factors that accompany the determined periodicity by applying the Fourier Transform algorithm.

In this embodiment, the program 104 initially receives transactional data based on a measured time variable, such as days, weeks and months. In this embodiment and in response to applying the Fourier Transform algorithm, the program 104 determines a signal power according to the calculated signal strength associated with the transactional received data based on the comparison of the correlation coefficients and the identified transactional noise associated with the transactional received data, wherein the correlation coefficients associated with the received transactional data are the measurement of time associated with the received transactional data and the predetermined threshold associated with the transactional received data. In this embodiment, the program 104 defines the signal power associated with the calculated signal strength as the squared magnitude of each calculated signal strength based on the conversion to the frequency-based domain and normalized by a number of frequency samples associated with the transactional data.

In this embodiment, the program 104 compares the correlation coefficients and the identified transactional noise by matching the contextual factors associated with the transactional data using a machine learning algorithm and an artificial intelligence algorithm. In this embodiment and in response to the contextual factors failing to match, the program 104 stores the contextual factors in the server computing device 108.

In another embodiment, the program 104 calculates a signal strength associated with the transactional data and a signal strength associated with the transactional noise by converting the transactional data from a time measurement to a frequency measurement, assigning a numerical value to the frequency measurement, and summing the assigned numerical values associated with the transactional noise and the remainder of the transactional data. In this embodiment, the program 104 identifies identical peaks within the transactional data that correlates with the calculated signal strength by detecting a point that meets or exceeds a predetermined threshold of transaction amount, where the predetermined threshold of transaction amount is based on a value that is equal to or greater than an average transaction amount over a concentrated fixed amount of time day period. In this embodiment, the program 104 deduces a periodicity of the received data by determining a pattern of identified identical peaks meeting or exceeding the predetermined threshold of transactional noise proportional to the signal power based on the calculated signal strength. For example, the program 104 determines that calculated signal strength associated with the account of user A based on the transactional noise associated with received transactional data exceeds the predetermined threshold of transactional noise. In this embodiment, the determined periodicity correlates with the number of identified peaks within the transactional data. For example, the larger the number of identified peaks within the signal power associated with the calculated signal strength, the higher the periodicity of transactional noise.

In step 208, the program 104 removes the transactional noise that meets or exceeds a predetermined signal strength within the received data using a filter. In this embodiment, the program 104 removes the identified transactional noise based on the determined periodicity by applying a filter that removes any transactional data that meets or exceeds a predetermined threshold of signal strength (i.e., amplitude) using the signal processing algorithm. In this embodiment, the program 104 defines amplitude as a measure of change between peak (highest amplitude value) and trough (lowest amplitude value, which can be negative). In this embodiment, the program 104 applies a filter that dynamically removes any transactional data with a calculated signal score that meets or exceeds the predetermined threshold of amplitude associated with the frequency of the received transactional data. For example, the program 104 removes the transactional data that has a calculated signal strength of 7 because the predetermined threshold of amplitude associated with the calculated signal strength is 5. In another embodiment, the program 104 filters the identified transactional noise by removing datapoints within the converted data that reaches a predetermined threshold of signal strength using the signal processing algorithm.

In step 210, the program 104 generates a line graph that removes the identified transactional noise. In this embodiment and in response to removing the transactional noise, the program 104 generates a line graph for each respective user and then compiles each generated line graph into a single generated line graph. In this embodiment, the program 104 generates the line graph with an x-axis that represents a time stamp associated with the received data. In this embodiment, the program 104 generates the line graph with a y-axis that represents amplitude. In this embodiment, the program 104 defines both the timestamp and amplitude as transaction vectors that may be calculated and compared. In this embodiment, the program 104 transmits the generated line graph associated with the received to a user interface display within a computing device 102 associated with a bank, a company, or a corporation. In another embodiment, the program 104 transmits the generated line graph to a server computing device 108 via a network 106 to be stored for future use and reference.

Figure 3:
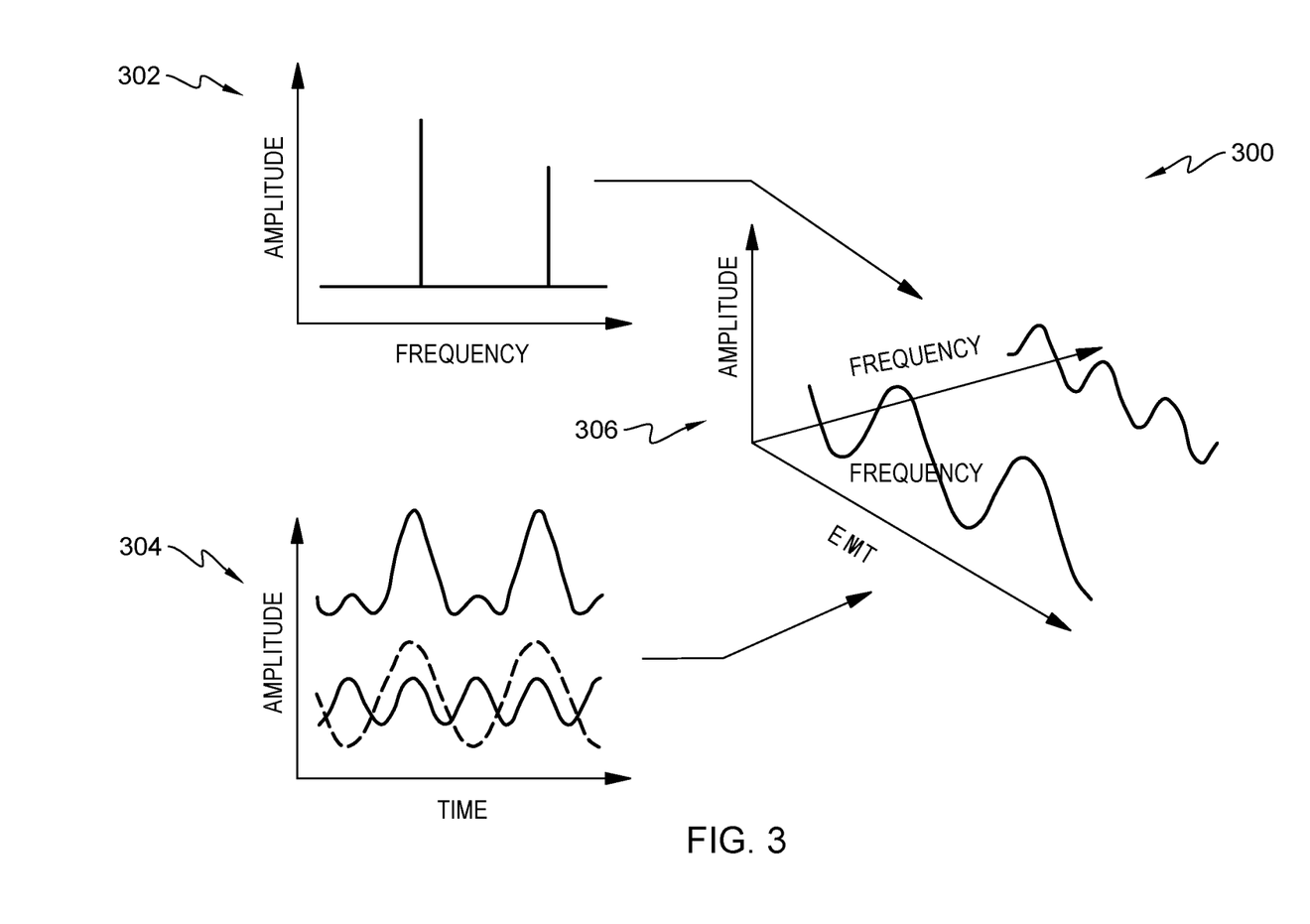
FIG. 3 is an exemplary chart illustrating line graphs that measure the calculated signal strength that display the removal of transaction noise using at least one signal processing technique, in accordance with at least one embodiment of the present invention.

FIG. 3 is an exemplary diagram 300 illustrating line graphs that measure the calculated signal strength that display the removal of transaction noise using at least one signal processing techniques, in accordance with at least one embodiment of the present invention.

In generated line graph 302, the program 104 depicts the x-axis defined as frequency and the y-axis defined as amplitude. In generated line graph 302, a first line depicts transactional data with a frequency of four and amplitude of seven; and a second line depicts transactional data with a frequency of eight and an amplitude of five. In generated line graph 304, the program 104 depicts the x-axis defined as time and the y-axis defined as amplitude. In generated line graph 304, a first wave depicts transactional data with a trough of seven and a peak of ten for a predetermined amount of time; a second wave depicts transactional data with a trough of three and a peak of four for the predetermined amount of time; and a third wave depicts transactional data with a trough of one and a peak of five for the predetermined amount of time. In generated line graph 304, the program 104 identifies the third wave as transactional noise based on the calculated signal strength of the third wave meeting or exceeding the predetermined threshold of amplitude. In generated line graph 306, the program 104 depicts the x-axis defined as time, the y-axis defined as frequency, and a z-axis defined as amplitude. In this embodiment, generated line graph 306 is a result of the program 104 converting the generated line graph 302 into a frequency-based domain from a time-based domain and removing the transactional noise of the generated line graph 304 using at least one signal processing technique (i.e., signal processing algorithm) to filter out the transactional noise. In generated line graph 306, a first wave depicts transactional data with a trough of one and a peak of four for a predetermined amount of time with a frequency of two; and a second wave depicts transactional data with a trough of one and peak of two for a predetermined amount of time with a frequency of eight. In this example, the first wave has a maximum transactional amount of four with a low frequency of two, which the program 104 determines as a pattern that does not indicate a fraudulent signal. In this example, the second wave has a maximum transactional amount of two but with a frequency of eight, which the program 104 determines as a pattern that may indicate a fraudulent signal due to the high number of transactions over a predetermined period of time that results in a frequency of eight. In this embodiment, generated line graph 306 depicts a determined pattern of transactional data without an inclusion of transactional noise. In another embodiment, the program 104 may use multiple signal processing techniques to convert transactional data from a time-based domain to a frequency-based domain and filtering transactional noise from the converted transactional data.

Figure 4:
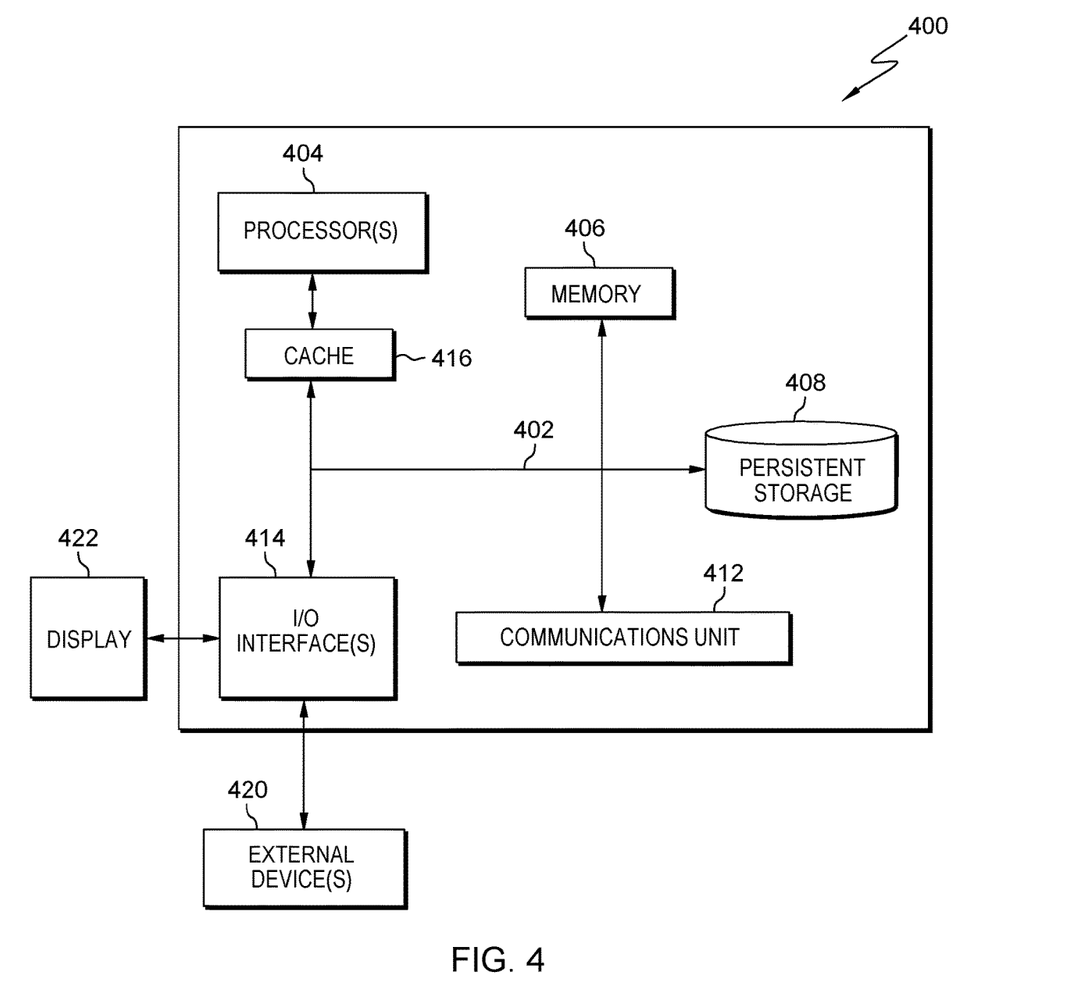
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   converting received data from a time-based domain to a frequency-based domain using a signal processing algorithm to provide converted data;
   defining one or more indicative markers corresponding to transactional noise, wherein the indicative markers are contextual details which identify transactional noise within legitimate transactions within a dataset and distinguish said transactional noise from pertinent data;
   identifying one or more transactional noise instances within the converted data based, at least in part, on the defined one or more indicative markers;
   filtering the one or more identified transactional noise instances by removing datapoints within the converted data that reach a predetermined threshold of signal strength using the signal processing algorithm; and
   generating a line graph depicting removal of the data that is indicative of the one or more identified transactional noise instances from the converted data.

2. The computer-implemented method of claim 1, wherein converting received data from the time-based domain to the frequency-based domain comprises applying a Fourier Transform algorithm on the converted data within the time-based domain to the frequency-based domain.

3. The computer-implemented method of claim 1, wherein identifying transactional noise within the converted data comprises:
   identifying a plurality of contextual factors within the converted data;
   identifying a plurality of indicative markers of a fraudulent signal associated with each contextual factor within the plurality of contextual factors; and
   determining a pattern associated with the identified transactional noise based on the identified plurality of one or more indicative markers of the fraudulent signal.

4. The computer-implemented method of claim 3, wherein determining the pattern associated with transactional noise comprises:
   matching at least one contextual factor within the plurality of contextual factors associated with the identified transactional noise with the converted data;
   converting the at least one contextual factor within the plurality of contextual factors associated with the identified transactional noise from the time-based domain to the frequency-based domain by using the signal processing algorithm; and
   calculating a signal strength associated with the converted plurality of contextual factors.

5. The computer-implemented method of claim 4, wherein calculating the signal strength comprises:
   converting at least one contextual factor within the plurality of contextual factors associated with the identified transactional noise from a time measurement to a frequency measurement;
   assigning a value to each converted contextual factor within the plurality of contextual factors based on the frequency measurement; and
   summing the assigned values of the converted contextual factors within the plurality of contextual factors associated with the identified transactional noise.

6. The computer-implemented method of claim 1, further comprising determining a periodicity associated with the identified transactional noise by calculating a frequency of transactions associated with the identified transactional noise occurring over a predetermined period of time.

7. The computer-implemented method of claim 4, further comprising determining a signal power associated with calculated signal strength by:
   squaring a magnitude value of each calculated signal strength within a plurality of calculated signal strength based on a conversion to the frequency-based domain; and
   normalizing the squared magnitude value of each calculated signal strength by a number of frequency samples associated with the converted data.

8. The computer-implemented method of claim 1, wherein filtering the identified transactional noise comprises dynamically removing datapoints within the converted data with a calculated signal power that meets or exceeds a predetermined threshold of amplitude, wherein the signal power is associated with a transactional amount and the amplitude is associated with a transactional frequency.

9. A computer program product comprising:
   one or more computer readable storage media and program instructions stored on the one or more computer readable storage media, the program instructions comprising:
   program instructions to convert received data from a time-based domain to a frequency-based domain using a signal processing algorithm to provide converted data;
   program instructions to define one or more indicative markers corresponding to transactional noise, wherein the indicative markers are contextual details which identify transactional noise within legitimate transactions within a dataset and distinguish said transactional noise from pertinent data;
   program instructions to identify one or more transactional noise instances within the converted data based, at least in part, on the defined one or more indicative markers;
   program instructions to filter the identified one or more transactional noise instances by removing datapoints within the converted data that reach a predetermined threshold of signal strength using the signal processing algorithm; and
   program instructions to generate a line graph depicting removal of the data that is indicative of the one or more identified transactional noise instances from the converted data.

10. The computer program product of claim 9, wherein the program instructions to convert received data from the time-based domain to the frequency-based domain comprise program instructions to apply a Fourier Transform algorithm on the converted data within the time-based domain to the frequency-based domain.

11. The computer program product of claim 9, wherein the program instructions to identify transactional noise within the converted data comprise:
    program instructions to identify a plurality of contextual factors within the converted data;
    program instructions to identify a plurality of indicative markers of a fraudulent signal associated with each contextual factor within the plurality of contextual factors; and
    program instructions to determine a pattern associated with the identified transactional noise based on the identified plurality of indicative markers of the fraudulent signal.

12. The computer program product of claim 11, wherein the program instructions to determine the pattern associated with transactional noise comprise:

program instructions to match at least one contextual factor within the plurality of contextual factors associated with the identified transactional noise with the converted data;

program instructions to convert the at least one contextual factor within the plurality of contextual factors associated with the identified transactional noise from the time-based domain to the frequency-based domain by using the signal processing algorithm; and program instructions to calculate a signal strength associated with the converted plurality of contextual factors.

13. The computer program product of claim 12, wherein the program instructions to calculate the signal strength comprises:

program instructions to convert at least one contextual factor within the plurality of contextual factors associated with the identified transactional noise from a time measurement to a frequency measurement;

program instructions to assign a value to each converted contextual factor within the plurality of contextual factors based on the frequency measurement; and program instructions to sum the assigned values of the converted contextual factors within the plurality of contextual factors associated with the identified transactional noise.

14. The computer program product of claim 9, wherein the program instructions stored on the one or more computer readable storage media further comprise:

program instructions to determine a periodicity associated with the identified transactional noise by calculating a frequency of transactions associated with the identified transactional noise occurring over a predetermined period of time.

15. The computer program product of claim 12, wherein the program instructions stored on the one or more computer readable storage media further comprise:

the program instructions to determine a signal power associated with calculated signal strength by:

program instructions to square a magnitude value of each calculated signal strength within a plurality of calculated signal strength based on a conversion to the frequency-based domain; and program instructions to normalize the squared magnitude value of each calculated signal strength by a number of frequency samples associated with the converted data.

16. The computer program product of claim 9, wherein the program instructions to filter the identified transactional noise comprise program instructions to dynamically remove datapoints within the converted data with a calculated signal power that meets or exceeds a predetermined threshold of amplitude, wherein the signal power is associated with a transactional amount and the amplitude is associated with a transactional frequency.

17. A computer system comprising:

one or more computer processors;

one or more computer readable storage media; and program instructions stored on the one or more computer readable storage media for execution by at least one of the one or more processors, the program instructions comprising:

program instructions to convert received data from a time-based domain to a frequency-based domain using a signal processing algorithm to provide converted data;

program instructions to define one or more indicative markers corresponding to transactional noise, wherein the indicative markers are contextual details which identify transactional noise within legitimate transactions within a dataset and distinguish said transactional noise from pertinent data;

program instructions to identify one or more transactional noise instances within the converted data based, at least in part, on the defined one or more indicative markers;

program instructions to filter the one or more identified transactional noise instances by removing datapoints within the converted data that reach a predetermined threshold of signal strength using the signal processing algorithm; and program instructions to generate a line graph depicting removal of the data that is indicative of the one or more identified transactional noise instances from the converted data.

18. The computer system of claim 17, wherein the program instructions to convert received data from the time-based domain to the frequency-based domain comprise program instructions to apply a Fourier Transform algorithm on the converted data within the time-based domain to the frequency-based domain.

19. The computer system of claim 17, wherein the program instructions to identify transactional noise within the converted data comprise:

program instructions to identify a plurality of contextual factors within the converted data;

program instructions to identify a plurality of indicative markers of a fraudulent signal associated with each contextual factor within the plurality of contextual factors; and program instructions to determine a pattern associated with the identified transactional noise based on the identified plurality of indicative markers of the fraudulent signal.

20. The computer system of claim 19, wherein the program instructions to determine the pattern associated with transactional noise comprise:

program instructions to match at least one contextual factor within the plurality of contextual factors associated with the identified transactional noise with the converted data;

program instructions to convert the at least one contextual factor within the plurality of contextual factors associated with the identified transactional noise from the time-based domain to the frequency-based domain by using the signal processing algorithm; and program instructions to calculate a signal strength associated with the converted plurality of contextual factors.

* * * * *